UNITED STATES PATENT OFFICE.

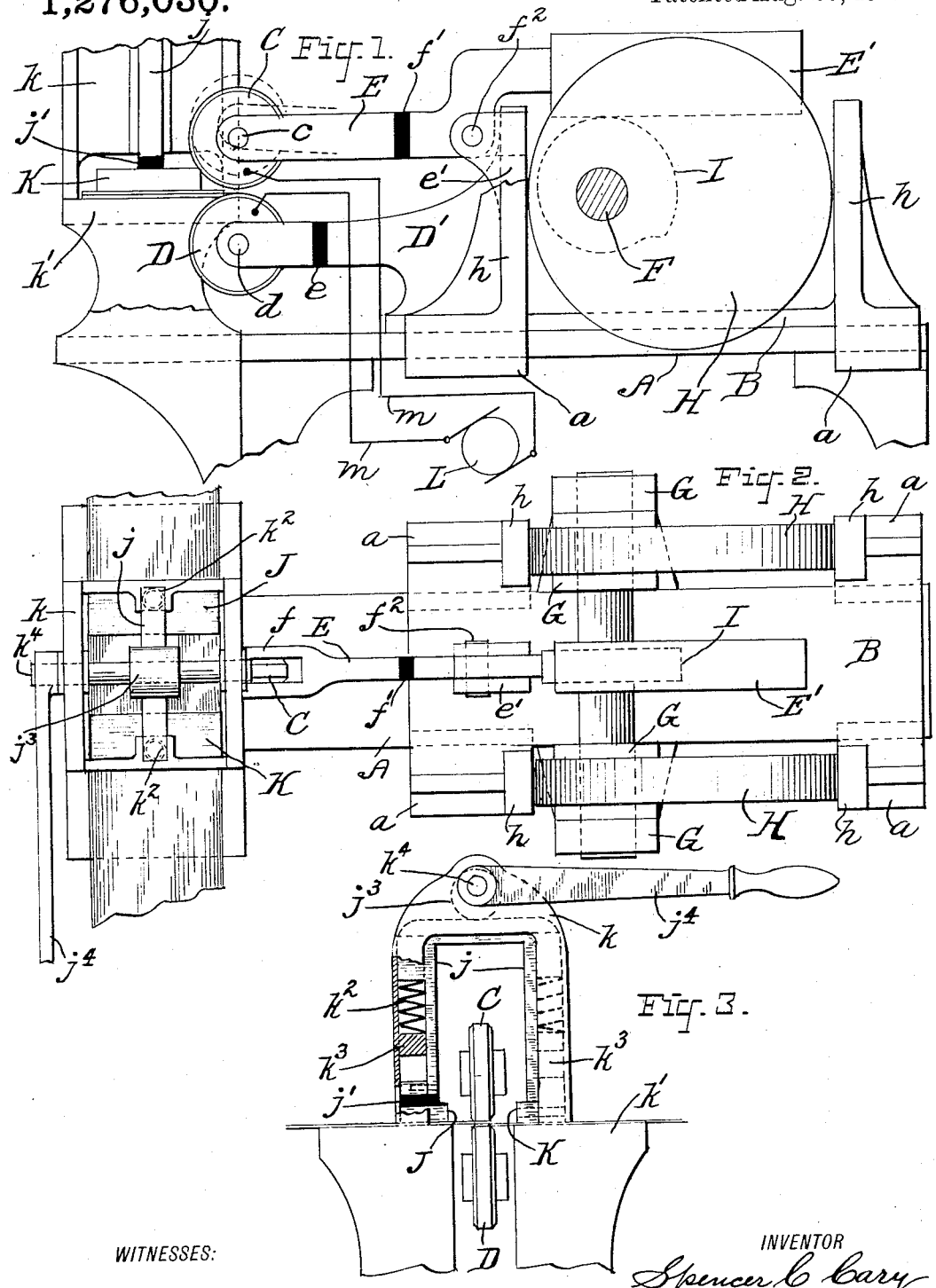

SPENCER C. CARY, OF BROOKLYN, NEW YORK.

ELECTRIC WELDER.

1,276,030.

Specification of Letters Patent.

Patented Aug. 20, 1918.

Application filed May 1, 1916. Serial No. 94,554.

*To all whom it may concern:*

Be it known that I, SPENCER C. CARY, a citizen of the United States, residing at the city of New York, borough of Brooklyn, county of Kings, and State of New York, have invented a certain new and useful Electric Welder, of which the following is a specification.

This invention is an electric welding mechanism, the same being adapted, more particularly, for the union of pieces of thin metal, such as sheet iron or steel.

The object of this invention is to unite pieces of thin metal rapidly and economically, the weld being continuous, uniform, and free from irregularities or roughness, whereby the resulting seam equals in strength the other metal of the pieces united together and the metal at the seam or weld is flush, or substantially so, with the surfaces and margins of said pieces.

According to this invention, the pieces to be welded are retained fixedly in position, and a roll or rolls are mounted for traversing said' fixedly retained pieces, whereby heat and pressure are adapted to be applied simultaneously by said roll or rolls to said pieces. With said roll or rolls are associated means for supplying an electric current to the juxtaposed margins of said pieces, said current operating to fuse the metal at the points of contact of said roll or rolls with the metal and said rolls acting to exert pressure upon the fused metal as the rolls traverse the same, thus effecting the sumultaneous application of electric heat and welding pressure whereby the metal is blended along the margins of the pieces so as to produce a continuous weld and the fused metal is distributed by the pressure of the rolls in such a manner as to result in a welded joint free from roughnesses and irregularities.

The welding mechanism embodies a combination of instrumentalities, including means for fixedly retaining the pieces in juxtaposition, a roll or rolls, means for imparting a traversing movement to said roll or rolls relatively to the juxtaposed marginal portions of the pieces, and means for supplying heat electrically to the juxtaposed pieces through said roll or rolls as the latter are moved relatively to said pieces.

In the art of welding iron or steel in sheets, the dimensions of such sheets preclude, as a practical operation, the movement of the sheets relatively to the roll or rolls, hence in my welder the roll or rolls are given a traversing movement relatively to the juxtaposed margins of sheets fixedly retained in position. As an example of the physical character of the sheet iron or steel requiring to be welded, I may mention that in the manufacture of many kinds of metal goods it is necessary to handle sheets exceeding twenty feet in length and four feet wide, the dimensions given being stated approximately only. It is customary to cut the sheet lengthwise into a plurality of pieces, but owing to the length of the sheet or the pieces cut therefrom, no means have been devised or are known to me whereby such long sheets or pieces thereof can be moved relatively to a stationary welding mechanism, particularly when it is considered that it is necessary frequently to weld such long pieces in end to end order, and, moreover, it is essential that the marginal end portions of such long pieces must be maintained accurately in lapping relation, the extent of such lap between the margins of the lapped pieces prior to welding being usually about one sixteenth of an inch. Manifestly, any disalinement of the long lapped strips brought about by a feed movement of such strips to a welding mechanism results in imperfect work which requires subsequent treatment in order to remedy the defect; but a welding mechanism characterized by current carrying roll or rolls movable relatively to fixedly retained metal pieces overcomes the foregoing and other apparent difficulties, and, in addition, solves the problem of producing a continuous flush weld by a rapid and economical mode of procedure.

Other features and advantages of the invention will appear from the following description taken in connection with the drawings, wherein:—

Figure 1 is an elevation, partly in section, of a welding mechanism embodying this invention.

Fig. 2 is a plan view.

Fig. 3 is an elevation looking at the left of Fig. 1, partly in section.

A designates a suitable table supported at a desired elevation by appropriate means, and upon this table is mounted a slidable bed B, the latter being provided with guides $a$ for directing the movement of the bed in a rectilinear path.

The bed carries pressure rolls C, D positioned in coöperative relation and one above the other, said pressure rolls being composed of a low resistance metal, such as copper. The rolls are movable relatively to each other so that they may be opened in order to clear the work to be welded, and so that they may be pressed into frictional contact with the metal during the welding operation. It is preferred to use two rolls positioned for contact with the upper and lower surfaces of the metal to be welded during the traversing movement of said rolls with respect to said metal, but as an equivalent for the two rolls I may employ an upper roll and a lower element in the form of an arm or other metal member adapted for contact with the under surface of the metal to be welded. As shown, the lower roll D is supported on a shaft $d$, free to turn in suitable bearings of a supporting arm D'. Said arm is insulated electrically at $e$ from a post $e'$ fixedly supported on the traveling bed B, whereby the roll-supporting arm D' is attached to the bed for movement therewith, and said arm D' and the roll D are electrically insulated from the sliding bed and other parts of the machine.

The upper roll C is supported by a shaft $c$ mounted in bearings $f$ provided on an end portion of a lever E. The lever is hung or fulcrumed on the upper part of the post $e'$ provided on the sliding bed B, said fulcrum of the post being indicated at $f^2$. The lever is electrically insulated at $f'$ from the post $e'$, and at the opposite end of this lever from the roll C it is provided with a counterpoise E', said counterpoise being in the form of a weight. The weight exceeds in heaviness the pressure roll C and that part of the lever which directly carries said roll, as a result of which the counterpoise tends to normally elevate the roll C with respect to the roll D, thus opening the two rolls so as to provide the required clearance between one roll and the metal to be welded.

Suitable means are provided for automatically imparting a traversing movement to the bed B, and pressure rolls C, D, and for operating the lever E so as to bring the two rolls into contact with the metal to be welded when said sliding movement is imparted to said bed and the pressure rolls.

A power shaft F is mounted in suitable bearings $g$ (not shown) provided on posts G of the table A, and on this shaft F are cams H, I.

It is preferred to employ two cams H coöperating with members $h$ of the bed B, whereby the rotary motion of cams H imparts a reciprocating motion to the bed B. The other cam I operates the lever E to overcome the counterpoise E' and move the roll C toward the roll D, said cam acting to close the rolls upon the metal prior to the action of cam H to impart the sliding movement to the bed and the rolls.

The pieces of metal to be welded are supported fixedly in position by clamps J, K, the latter being so positioned with respect to the path of the rolls C, D that said rolls are adapted for contact with the proximate end portions of the pieces to be welded. The work holders are supported fixedly in position on suitable parts of the frame which supports the table.

The clamps J, K of the work-holders may be operated in any suitable way, but, as shown in Fig. 3, they are attached to an operating member $j$ in the form of a sliding yoke, said clamps being insulated at $j'$ from the yoke. The legs of the yoke $j$ are fitted slidably in an upright frame $k$ attached to a suitable bed $k'$ fixed to the machine frame. The legs of the slidable yoke $j$ are recessed to receive springs $k^2$, the lower ends of which are seated upon shoulders $k^3$ of the frame $k$, whereby the springs lift the yoke $j$ and the clamps J, K. After the pieces of metal are positioned in lapping relation as shown by the drawings (Fig. 3), the clamps J, K are pressed downward upon the metal pieces and thus coöperate with the bed $k'$ in fixedly retaining the pieces in position. As shown, a rock shaft $k^4$ is mounted in frame $k$, and is provided with a cam $j^3$ and lever $j^4$, whereby the yoke and the clamps are forcibly moved downward.

The welding mechanism herein disclosed is especially designed for uniting the marginal portions of pieces of sheet metal, such as iron or steel, and in operation one piece of metal to be welded is retained fixedly by clamp J, whereas the other piece of metal is similarly retained by clamp K.

Electric current from a suitable source of energy, such as the generator L, is adapted to be supplied through the pressure rolls C, D, said generator L being in a circuit which includes the conductors $m$ and a suitable switch (not shown), whereby the current is adapted to flow through roll C, thence through the metal to be welded, roll D, and back to the generator.

The operation may be described briefly as follows: The two pieces of metal to be welded are positioned within the work holder and held by clamps J, K so as to bring the marginal portions of the pieces into lapping relation, after which the lever $j^4$ is operated to move said clamps upon the pieces so that the clamps fixedly retain the pieces of metal in position to be welded. Current is supplied to the rolls C, D, and the shaft F operates the cams H, I. Said cam I acts on the lever E to move the roll C toward and into contact with the metal, and immediately thereafter cam H imparts movement to the bed B whereby the rolls C, D are carried relatively to the metal and in contact therewith. The resistance of the lapped metal to the flow of current supplied by the rolls C, D fuses the metal at the marginal portions, and this fused metal is acted upon by the pressure of the rolls so as to displace the metal uniformly and result in a continuous weld. The coöperating rolls are moved in a path between the work holders and in the direction of the seam or weld, and the mechanism acts to simultaneously feed current to the rolls, to press the rolls forcibly into contact with the lapped edges, and to progressively weld said lapped edges, as a result of which the doubled thickness of metal is rolled down along the seam to the gage of the individual thin sheet, such rolling of the heated metal taking place simultaneously with the welding and the rolling operation being effective in producing a weld which is free from surface irregularities and from roughnesses at the edge portions of the sheet. As the rolls complete the traversing movement in one direction, the cam I acts upon lever E to separate roll C from roll D, thus providing the necessary clearance between the rolls and the metal, and the bed and the rolls are moved under the action of the cam H, the upper roll being free from the metal on the return movement of said rolls.

Having thus fully described the invention, what I claim as new, and desire to secure by Letters Patent is:

1. Electric welding mechanism embodying a plurality of work holders spaced relatively to each other and operable for fixedly retaining the juxtaposed pieces to be welded, current-carrying welding electrodes one of which is a roll positioned for movement in a path intermediate said work holders, and means for imparting movement to said welding electrode roll in the direction of the resulting seam which joins said juxtaposed pieces.

2. A welding mechanism embodying means for retaining juxtaposed pieces to be welded in fixed positions, a heatable pressure roll and a coöperating element both movable bodily with respect to said fixedly retained pieces, and means for imparting a traversing movement to said roll and element relatively to said pieces, whereby the juxtaposed margins of said pieces are fused and subjected to welding pressure simultaneously by the traversing movement imparted to said roll and element.

3. Electric welding mechanism embodying a plurality of work holders spaced relatively to each other and operable for fixedly retaining in lapping contact the juxtaposed pieces to be welded, a plurality of current carrying welding electrodes at least one of which is a roll positioned for traversing movement in a path intermediate said work holders, means acting to press said welding electrode roll into forcible contact with the lapped portions of the pieces to be welded, and means for imparting movement to said welding electrode roll in the direction of the seam which joins said juxtaposed pieces, said coöperating welding electrodes acting to apply electric heat and welding pressure to the juxtaposed pieces and simultaneously therewith to roll the lapped metal substantially to the gage of the individual pieces of metal.

4. Electric welding mechanism embodying means for fixedly retaining juxtaposed pieces to be welded, a plurality of current carrying welding rolls, means for feeding electric current through said rolls so as to apply electric heat to the juxtaposed pieces, pressure means for exerting pressure through the rolls upon the juxtaposed piece simultaneously with the electrical heating thereof, and means for imparting a traversing movement to said welding rolls in the direction of the seam or weld which joins the juxtaposed pieces.

5. Metal welding mechanism embodying means for fixedly retaining juxtaposed pieces to be welded in lapping relation at the marginal portions thereof, a pressure roll and coöperating element, means for imparting a traversing movement to said roll and coöperating element in a direction parallel to the lap between said pieces to roll the joint to the thickness of the individual pieces, and means for supplying a welding heat through said roll to the lapped margins of the juxtaposed pieces.

6. Metal welding mechanism embodying means for fixedly retaining juxtaposed pieces to be welded in lapping relation at the marginal portions thereof, a current carrying pressure-roll and coöperating element, means for moving said pressure roll and element while in contact with said lapped margins and in a direction parallel to the lap between said pieces to roll the joint to the thickness of the individual pieces, and means for supplying electric current to said pieces through said pressure roll during the traversing movement.

7. Electric welding mechanism embodying means for fixedly retaining juxtaposed pieces in lapping contact at the marginal portions thereof, a plurality of current-carrying welding electrodes one of which is a roll positioned for movement in the direction of the resulting seam or weld between the juxtaposed pieces, pressure means whereby the welding electrode roll acts to forcibly apply pressure to the lapped metal softened by heat supplied through said electrodes, and means for imparting a traversing movement to the welding electrode roll, said pressure means and said movement imparting means acting simultaneously with the feeding of electric current by the agency of said welding electrodes.

8. Electric welding mechanism embodying work retaining means for fixedly holding pieces to be welded, a plurality of coöperating welding electrodes one of which is a roll positioned for movement in the direction of the resulting seam intermediate said pieces, means for feeding electric current by the agency of said electrodes to said pieces, pressure means for the welding electrode roll, and means for imparting a traversing movement to said welding electrode roll, said pressure means and the movement imparting means acting concurrently with the application of electric heat for progressively welding said pieces and the electrode roll during its traversing movement operating to roll down the metal at the seam or weld substantially to the gage of the individual pieces.

9. Electric welding mechanism embodying means for retaining the pieces to be welded, a plurality of current carrying welding rolls, means for imparting traversing movement to said rolls in the direction of the resulting seam or weld, and pressure means for securing forcible contact of said rolls with the pieces to be welded, said pressure means and the movement imparting means coöperating with said welding rolls simultaneously with the application of electric heat through said rolls for progressively welding the pieces and rolling the seam or weld substantially to the gage of the individual pieces.

10. Sheet metal welding mechanism embodying a relatively stationary work-retaining means, a plurality of current-carrying pressure rolls positioned for contact with the respective surfaces of the pieces to be welded, means for feeding an electric welding circuit to said pieces through the agency of said rolls, and cam means for imparting movement to said rolls in the direction of the line of the resulting weld between said pieces.

11. Sheet metal welding mechanism embodying a relatively stationary work-retaining means, a pivoted heatable pressure roll and a coöperating element, means for imparting a traversing movement to said roll and element, and a counterbalance for said roll controlled by said means.

12. Sheet metal welding mechanism embodying a relatively stationary work-retaining means, a pivotally mounted current-carrying pressure roll and a coöperating element mounted for movement in the direction of the line of the resulting weld between the pieces to be welded, a counterpoise for said roll and cam means for imparting motion to said roll and element and for actuating said counterpoise.

In testimony whereof I have hereunto signed my name.

SPENCER C. CARY.